(12) United States Patent
Young

(10) Patent No.: US 7,251,255 B1
(45) Date of Patent: Jul. 31, 2007

(54) SYSTEM AND METHOD FOR ALLOCATING RESOURCES ACROSS A PLURALITY OF DISTRIBUTED NODES

(75) Inventor: Steven Jay Young, Los Gatos, CA (US)

(73) Assignee: Digeo, Inc., Kirkland, WA (US)

( * ) Notice: Subject to any disclaimer, the term of this patent is extended or adjusted under 35 U.S.C. 154(b) by 1194 days.

(21) Appl. No.: 10/335,440

(22) Filed: Dec. 30, 2002

Related U.S. Application Data

(63) Continuation-in-part of application No. 10/261,548, filed on Sep. 30, 2002, which is a continuation-in-part of application No. 10/227,045, filed on Aug. 23, 2002, and a continuation-in-part of application No. 10/226,576, filed on Aug. 23, 2002, and a continuation-in-part of application No. 10/227,120, filed on Aug. 23, 2002, and a continuation-in-part of application No. 10/226,611, filed on Aug. 23, 2002.

(51) Int. Cl.
*H04J 3/16* (2006.01)
*H04J 3/22* (2006.01)

(52) U.S. Cl. ...................... 370/468; 370/486

(58) Field of Classification Search ............... 370/431, 370/468, 485, 486, 487, 389, 401; 709/223, 709/226
See application file for complete search history.

(56) References Cited

U.S. PATENT DOCUMENTS

| | | | | |
|---|---|---|---|---|
| 6,324,184 B1 * | 11/2001 | Hou et al. | ................... | 370/468 |
| 7,006,530 B2 * | 2/2006 | Spinar et al. | ............... | 370/468 |
| 2002/0158797 A1 * | 10/2002 | Kelly et al. | .................. | 342/359 |
| 2004/0008726 A1 * | 1/2004 | Kelly et al. | .................. | 370/468 |
| 2004/0081091 A1 * | 4/2004 | Widmer et al. | ............. | 370/230 |
| 2004/0106431 A1 * | 6/2004 | Laroia et al. | ............ | 455/552.1 |

* cited by examiner

*Primary Examiner*—Ajit Patel
(74) *Attorney, Agent, or Firm*—Kory D. Christensen; Stoel Rives LLP

(57) ABSTRACT

A system is described comprising: an originating node having system resources to be utilized to deliver multimedia content and/or data to a plurality of multimedia devices; and a resource allocation module to allocate the system resources to each of the multimedia devices based on a detected state of each of the multimedia devices.

47 Claims, 10 Drawing Sheets

SYSTEM AND METHOD FOR ALLOCATING RESOURCES ACROSS A PLURALITY OF DISTRIBUTED NODES

PRIORITY

This application is a continuation-in-part of the application entitled A System and Method for Automatically Sensing the State of a Video Display Device, Ser. No. 10/261,548, filed Sep. 30, 2002 (hereinafter "Device Sensing Application"), which is a continuation-in-part of the following applications:

An Apparatus and Method for Distributing Video Content Using Existing Network Wiring, Ser. No. 10/227,045, filed Aug. 23, 2002;

A System and Method for Improving Network Utilization by Frequency-Shifting Signals, Ser. No. 10/226,576, filed Aug. 23, 2002;

An Apparatus and Method for Powering a Network Device, Ser. No. 10/227,120, filed Aug. 23, 2002;

A System and Method for Distributing Audio and Video Content to a Plurality of Multimedia Nodes, Ser. No. 10/226,611, filed Aug. 23, 2002.

BACKGROUND

1. Field of the Invention

This invention relates generally to the field of distributed multimedia and computing systems. More particularly, this invention relates to a multimedia and computing system in which processing resources are intelligently allocated across plurality of multimedia nodes.

2. Description of the Related Art

When subscribing to a cable or satellite television service, a cable or satellite receiver is typically required for each television set within the user's home. One problem with this scenario is that cable and satellite receivers, or "set-top boxes," are costly to manufacture, particularly those equipped with mass storage devices for storing television programming (commonly known as "Personal Video Recorders" or "PVRs"). As such, requiring an individual set-top box for each television set is an unreasonable solution in many cases (e.g., particularly if the user has numerous television sets).

To solve this and other problems, the assignee of the present application has developed a multimedia system and associated technologies for distributing multimedia content (e.g., cable/satellite television programming) from a primary receiver device to a plurality of secondary devices. The primary receiver device is a relatively high-powered device (i.e., relative to the secondary devices), capable of concurrently processing multiple satellite/cable channels and distributing those channels to the secondary devices. Because most of the signal processing load is handled by the primary receiver device, the secondary devices can be manufactured relatively inexpensively, resulting in a more efficient solution for the end user and the cable/satellite service provider.

Embodiments of one such multimedia system are set forth in the co-pending application entitled Multimedia and Computing System, filed Sep. 1, 2000 (Ser. No. 09/653,964), which is assigned to the assignee of the present application and which is incorporated herein by reference. As illustrated in FIG. 1, in one embodiment of the multimedia system, a media server 110 (e.g., a "set-top box" or game console) equipped with a processor and a mass storage device acts as a central repository for decoding and storing multimedia content and distributing the multimedia content to a plurality of distributed nodes. More particularly, the media server 110 processes multimedia content from Internet communication channels 120 (e.g., DSL, cable modem), broadcast communication channels 130 (e.g., digital/analog cable, satellite), and/or Public Switched Telephone Network ("PSTN") communication channels 170 (i.e., standard telephone) to provide a stable, real-time home media network 140 for a plurality of network devices 150-151, 160-166.

When the signal processing and storage resources of a primary device are spread across a plurality of secondary devices, it is important to allocate those resources in an intelligent manner. For example, if a television set coupled to a particular secondary device is off, it would be beneficial to communicate this information back to the primary device so that the primary device can reallocate the multimedia resources consumed by the secondary device (which is not being used) to a different secondary device, and/or to the storage device on the primary node itself.

The Device Sensing Application (mentioned above) describes a system for detecting the states of a plurality of secondary devices (referred to as "receiving nodes") and reallocating tuners within the primary device (referred to as the "originating node") based on the detected states. However, depending on the system configuration and system utilization, resources other than tuners may be limited (e.g., hard drive subsystem resources, wireless bandwidth, decryption subsystem resources, . . . etc). Accordingly, it would be beneficial to develop a system in which various different types of system resources, including tuners, may be intelligently allocated across a plurality of receiving nodes.

BRIEF DESCRIPTION OF THE DRAWINGS

A better understanding of the present invention can be obtained from the following detailed description in conjunction with the following drawings, in which.

Figure 1:
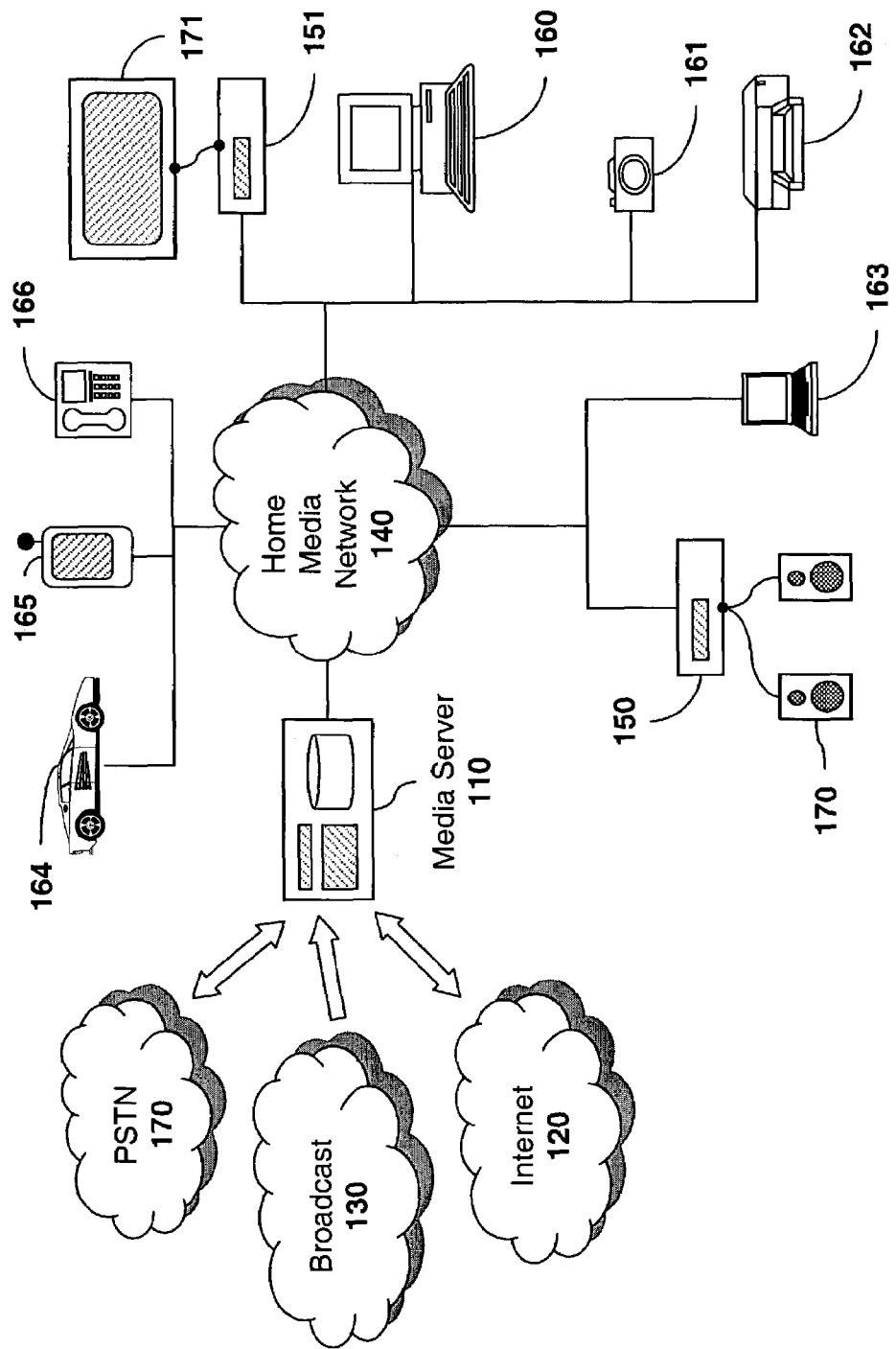
FIG. 1 illustrates one embodiment of a multimedia distribution system including a media server.

EMBODIMENTS OF A SYSTEM AND METHOD FOR ALLOCATING RESOURCES ACROSS A PLURALITY OF NODES

Detailed Description

In the following description, for the purposes of explanation, numerous specific details are set forth in order to provide a thorough understanding of the present invention. It will be apparent, however, to one skilled in the art that the invention may be practiced without some of these specific details. In other instances, well-known structures and devices are shown in block diagram form to avoid obscuring the underlying principles of the invention.

As mentioned above, the Device Sensing Application describes a system and method for automatically detecting the state of a video display device (or other multimedia device) and reallocating tuners based on the detected state. Specifically, referring to FIG. 2, the Device Sensing Application describes an originating node 200 which distributes multimedia content and data (e.g., live television channels and stored audio/video content) to a plurality of receiving nodes 210, 211. If the originating node 200 is only equipped with three standard cable/satellite tuners 201-203, then it may only be capable of concurrently distributing three cable/satellite channels. Accordingly, if one tuner 201 is allocated to the local display device 222 (i.e., the television coupled directly to the originating node 200, as in a typical set-top box configuration), one tuner 202 is allocated to one of the remote receiving nodes 211 and one tuner 203 is allocated to the mass storage device 203 (e.g., to record a user-specified program), then the originating node 200 is unable to distribute an additional channel to the remaining receiving nodes 210. Similarly, if the originating node 200 allocates all three tuners 201-203 to the local display device 210 and the two receiving nodes 210 and 211, then it is unable to concurrently record a cable/satellite program to the mass storage device 230.

To solve this problem, one embodiment of the invention described in the Device Sensing Application intelligently allocates tuners to local and remote display devices and mass storage devices based on whether these devices are being utilized. In one embodiment, if a particular display device 211 is not being utilized (e.g., because a user has turned the device off), then the originating node 200 reallocates the tuner servicing the receiving node 210 of that device 211 to an alternate receiving node (e.g., node 210), or to the mass storage device 230.

In one embodiment, state detection logic is provided at each receiving node and at the originating node (illustrated as "state detection logic" 260) in order to determine whether each display device is in an "on" or "off" state (or in some intermediate "sleep" state). One particular type of state detection logic described in the Device Sensing Application is power detection logic which determines the state of the video display device by detecting power consumption of the device. As described in the Device Sensing Application, however, various different mechanisms may be employed to detect the "state" of the display device while still complying with the underlying principles of the invention. For example, if a data communication channel exists between the display device and the originating nodes and/or receiving nodes, then the display device may communicate its state directly to the originating and/or receiving nodes.

The detected states of the various display devices are provided to a resource allocation module 250 which reallocates the bank of tuners 201-203 accordingly. For example, in one embodiment, if a particular display device 220 is not being utilized (e.g., because a user has turned the device off), then the originating node 200 reallocates the tuner 203 servicing the receiving node 210 of that display device 220 to an alternate receiving node (e.g., node 410), or to the mass storage device 230.

However, in certain cases, depending on the configuration and utilization of the originating node 200, the number of tuners may be adequate to service the originating node and all of the receiving nodes but other types of system resources may be limited. For example, if multiple users simultaneously attempt to view television programming stored on the mass storage device 230 (rather than live television programming), the tuners will not even be utilized but the mass storage device subsystem may be pushed to its limits.

Figure 3:
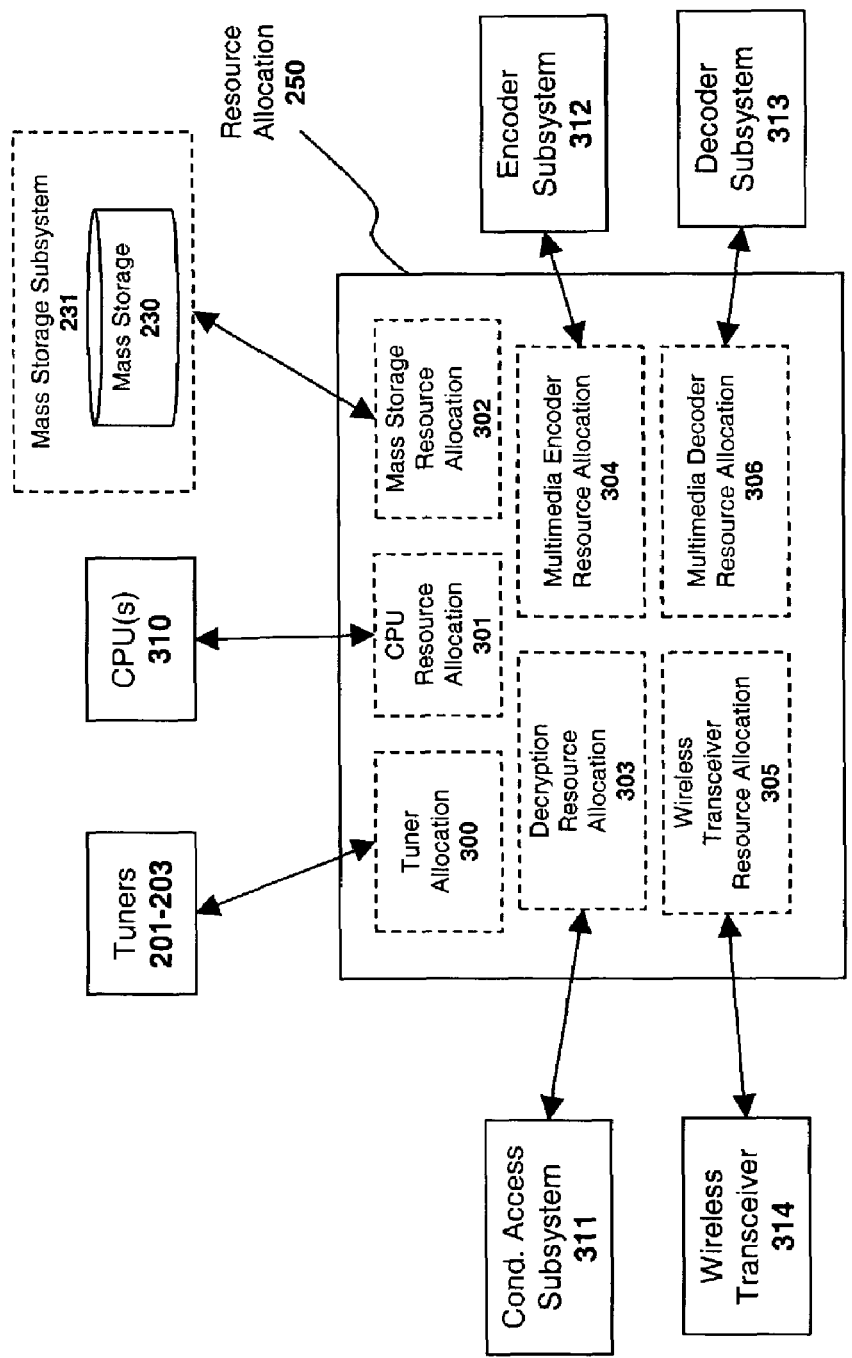
FIG. 3 illustrates one embodiment of a resource allocation module which allocates system resources based on the detected states of devices coupled to a multimedia system.

As such, in one embodiment of the invention, the resource allocation module 250 intelligently allocates various types of system resources in addition to, or in lieu of, tuning resources. Referring to FIG. 3, one embodiment of the resource allocation module 250 is comprised of a series of resource-specific allocation components including a tuner allocation module 300 for allocating tuners (e.g., as described above); a CPU resource allocation module 301 for allocating the resources of the system CPU(s) 310; a mass storage resource allocation module 302 for allocating the resources of the mass storage device subsystem 231; a decryption subsystem resource allocation module 303 for allocating resources of the decryption subsystem 311; a multimedia encoder resource allocation module 304 for allocating encoders within an encoder subsystem 312; a wireless network resource allocation module 305 for allocating wireless bandwidth provided via a wireless transceiver 314; and a multimedia decoder resource allocation module 306 for allocating decoders within a decoder subsystem 313.

Figure 4:
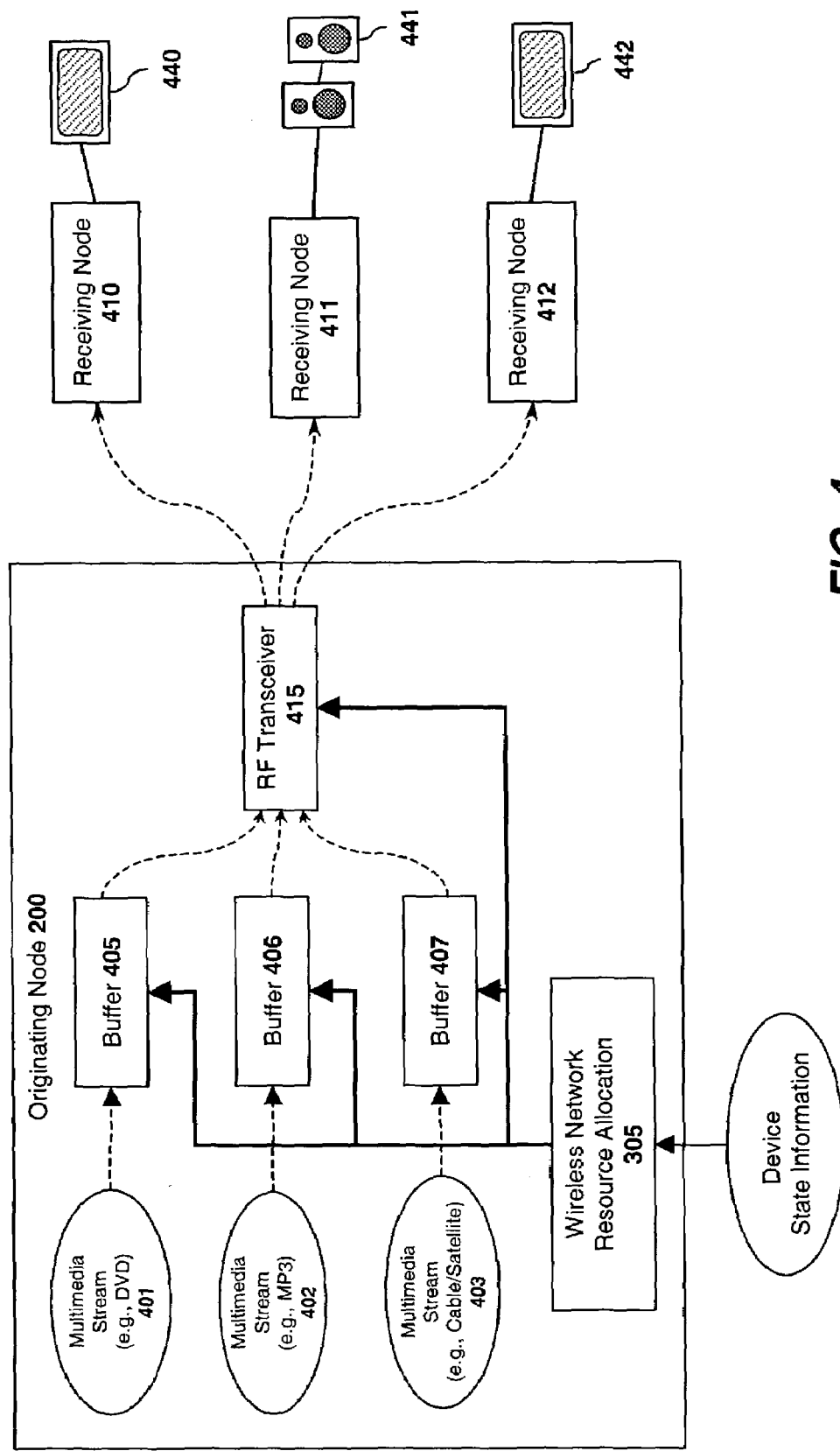
FIG. 4 illustrates a wireless network resource allocation module according to one embodiment of the invention.

As mentioned above, in one embodiment, the originating node 200 communicates with the receiving nodes 210, 211 over a wireless network (e.g., such as 802.11 network). FIG. 4 illustrates one embodiment in which a series of multimedia streams 401-403 are wirelessly transmitted by an RF transceiver 415 to a series of receiving nodes 410-412. Buffers 405-407 are employed to temporarily store each of the streams 401-403 prior to transmission. The streams 401-403 may be comprised of various different types of content (e.g., MPEG-2, MP3 . . . etc) and may be received from various different sources (e.g., a live satellite feed, a DVD player configured on the originating node 200, a mass storage device, . . . etc).

Depending on the system configuration and/or system utilization, the total bandwidth supported by the wireless network may not be sufficient to concurrently transmit all of the streams 401-403 to each of the receiving nodes. As such, in order to ensure that wireless bandwidth is not wasted, in one embodiment, a wireless network resource allocation module 305 intelligently allocates the available wireless bandwidth to each of the respective receiving nodes 410-412. For example, in response to detecting that the display device 440 coupled to receiving node 410 is "off" (i.e., based on the state information transmitted from the receiving node 410), the wireless network resource allocation module 305 causes the RF transceiver 415 to terminate the stream 401 and close off the bandwidth allocated to the receiving node 410, thereby freeing up bandwidth for the remaining receiving nodes 411-412.

In one embodiment, the wireless network resource allocation module 305 allocates bandwidth, not only based on the state of the receiving nodes 410-412, but also based on the type of content requested by each of the receiving nodes 410-412. For example, for realtime applications such as MPEG-2 video, the resource allocation module 305 may allocate a relatively large chunk of bandwidth (e.g., a minimum threshold required to support an MPEG-2 video stream). By contrast, for non-realtime applications such as Web browsing or e-mail, the resource allocation module 305 may allocate significantly less bandwidth, or may allocate bandwidth only as it becomes available based on the combined bitrates of the MPEG-2 streams (e.g., at times when the bitrates of the MPEG-2 streams drops below some threshold level).

Figure 5:
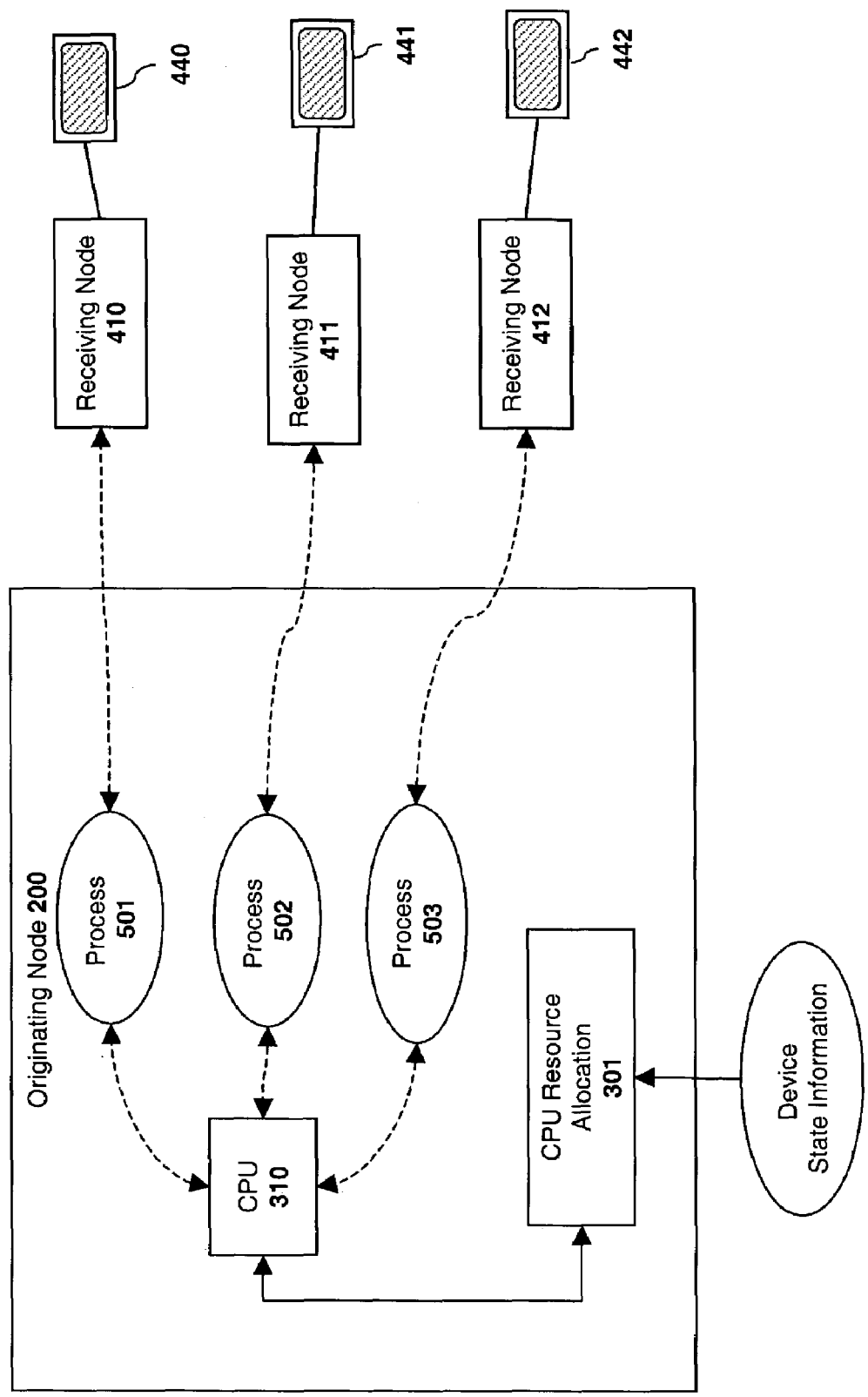
FIG. 5 illustrates a CPU resource allocation module according to one embodiment of the invention.

As illustrated in FIG. 5, the processing resources provided by the CPU 301 may also be spread across each of the receiving nodes 410-412. In the illustrated embodiment, three processes 501, 502, and 503 are executed by the CPU 310 on behalf of receiving nodes 410, 411, and 412, respectively. The processes 501-503 may be application programs including, by way of example and not limitation, video games, word processing programs, Web browsing programs, e-mail clients, . . . etc. Depending on processing requirements of each of the processes 501-503, the CPU resources may be over utilized. For example, certain types of processes such as graphics-intensive video games may require significant CPU resources. As such, in one embodiment, a CPU resource allocation module 301 terminates, pauses or otherwise limits the CPU resources available to a process in response to the detected state of the display device associated with that process. For example, if a user playing a video game at receiving node 410 turns off the display device 440 associated with that receiving node 410, the CPU resource allocation module 301 may either terminate or pause the video game, thereby freeing CPU resources for the remaining receiving nodes 411-412.

In one embodiment, whether the CPU resource allocation module 301 terminates, pauses or merely limits the CPU resources available to a process depends on the type of process being executed. For example, unlike video games, which may logically be terminated or paused if the display device 440 at the receiving node 410 is turned off, the user may want other types of processes to continue to run, regardless of the state of the video display device 410. For example, a user may want the CPU 301 to continue to compile a program written by the user even after the user turns off the display device 440. As such, the user may specify that the process should continue to run, notwithstanding the state of the display device 440. The CPU resource allocation module 301 may then simply limit the CPU resources consumed by the process.

Figure 6:
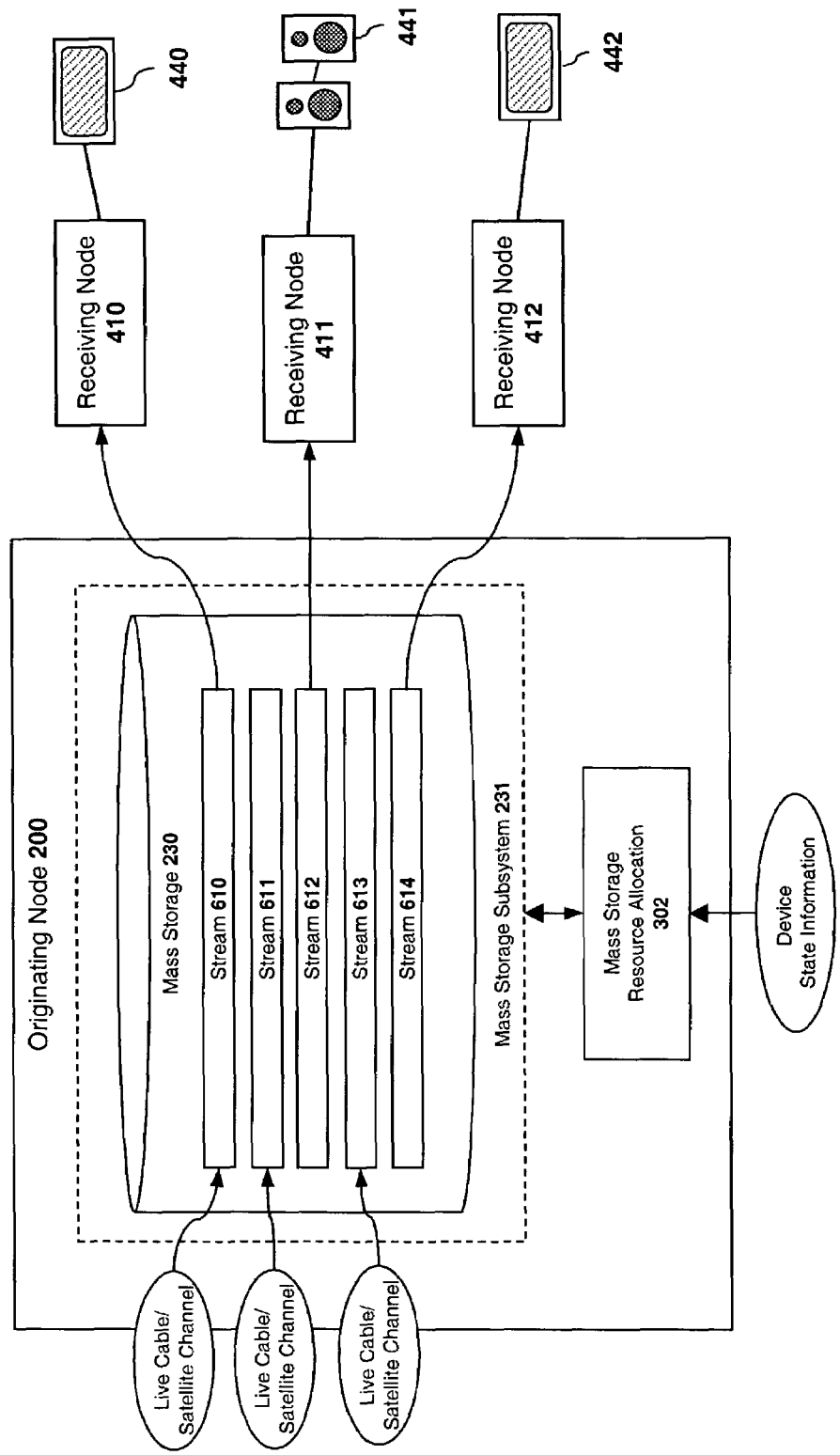
FIG. 6 illustrates a mass storage resource allocation module according to one embodiment of the invention.

FIG. 6 illustrates the originating node's mass storage device 230 and associated mass storage device subsystem 310. The subsystem 310 includes the interface between the mass storage device and the originating node 200. For example, if the mass storage device 230 is an enhanced IDE hard drive, then the subsystem 310 comprises an enhanced IDE interface (e.g., an ATA 66/100/133 interface). In the embodiment shown in FIG. 6, the mass storage device 230 is concurrently recording three different multimedia streams 610, 611 and 613 and supplying three streams 610, 612 and 614 to three receiving nodes 410, 411, and 412, respectively. Given the inherent data throughout limitations of the mass storage device 230 and subsystem 310 (e.g., 100 Mbytes/sec for an ATA 100 IDE interface), a limited number of streams may be written and read concurrently. Thus, to conserve mass storage resources, in one embodiment, a mass storage resource allocation module 302 reallocates mass storage device resources in response to the detected state of each device 440-442. For example, in response to detecting that a particular display device 440 has been turned off, the mass storage resource allocation module 302 may terminate the reading/writing of stream 610. The resources previously used to read/write stream 610 may then be reallocated to another recording/playback task such as, for example, recording one of the user's "favorite" channels. Conversely, in response to detecting that the display device 440 is turned from an "off" state to an "on" state, the mass storage resource allocation module 302 may discontinue recording of a particular channel so that resources are available to supply a multimedia stream to receiving node 410.

Figure 7:
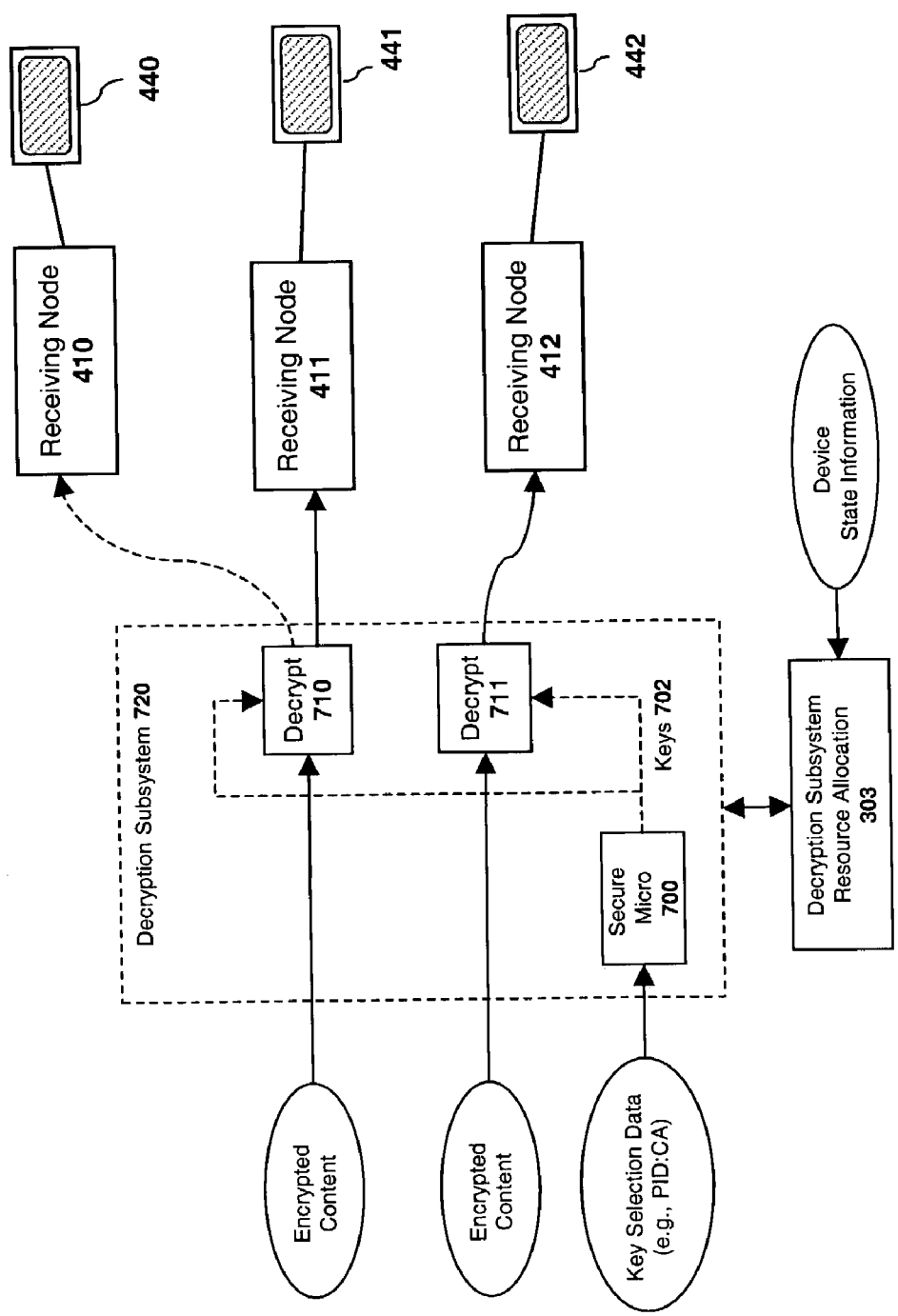
FIG. 7 illustrates a decryption subsystem resource allocation module according to one embodiment of the invention.

In order to prevent users from viewing certain channels which they do not have the right to view (e.g., subscription based and pay-per-view channels) the channels are frequently encrypted using a series of encryption keys prior to transmission. Accordingly, multimedia systems are generally equipped with decryption subsystems, such as the decryption subsystem 720 illustrated in FIG. 7, for decrypting the incoming multimedia content. The illustrated decryption subsystem 720 includes two decryption modules 710-711, each capable of decrypting one channel at a time, and a secure micro unit 700, which supplies the decryption keys 702 to each of the decryption modules 710-711.

Because each decryption module 710-711 is only capable of decrypting one channel at a time, the decryption subsystem may represent a signal processing bottleneck if too many encrypted channels are concurrently selected for playback. As such, in one embodiment, a decryption subsystem resource allocation module 303 is provided to intelligently allocate the decryption subsystem resources based on the detected states of each of the receiving nodes 410-412. For example, in response to detecting that display device 440 has been turned "on" and that display device 441 is "off," the decryption subsystem resource allocation module 303 may reallocate the decryption module 710 from receiving node 411 to receiving node 410, as illustrated. Of course, if the channel requested on receiving node 410 is unencrypted, then the decryption subsystem resource allocation module 303 will not need to reallocate the decryption module 710.

Figure 8:
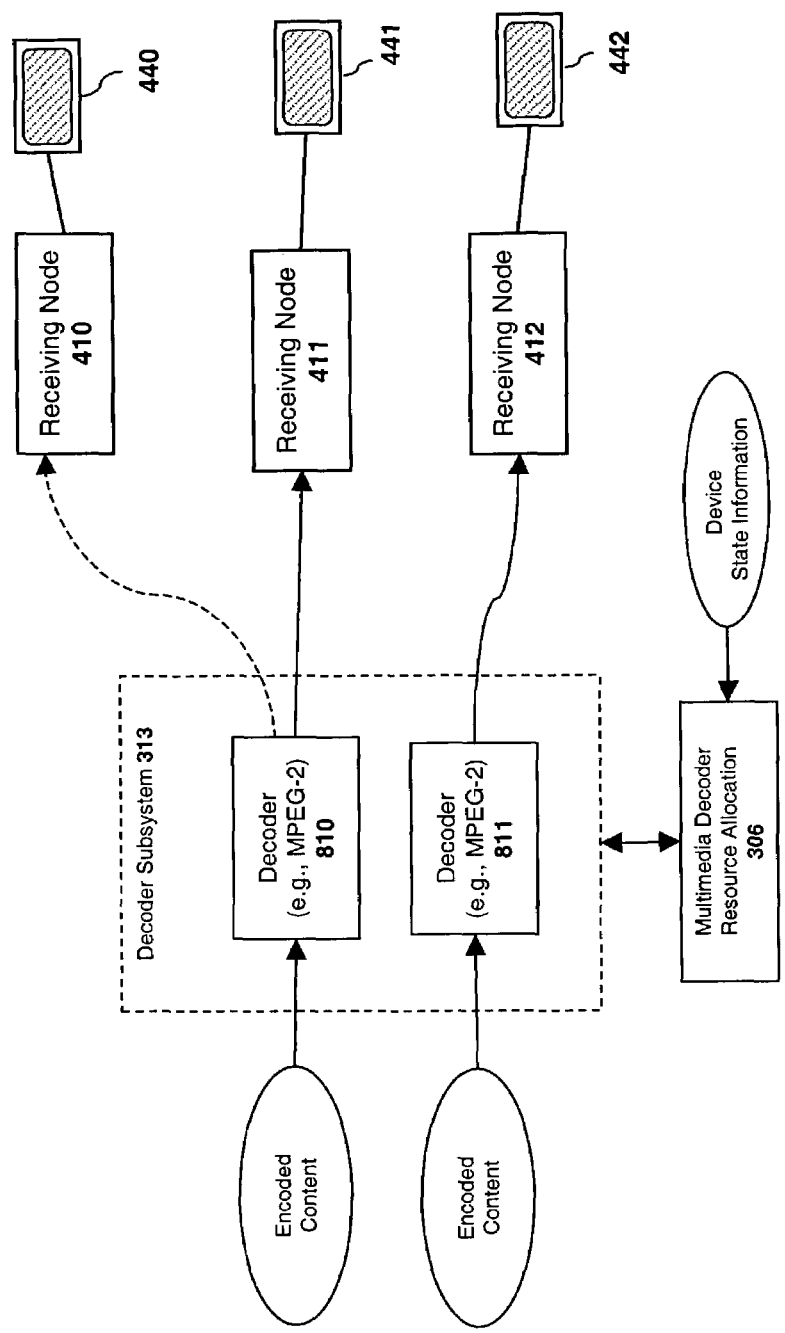
FIG. 8 illustrates a decoder resource allocation module according to one embodiment of the invention.

Referring now to FIG. 8, set-top boxes typically include a decoder subsystem 313 comprised of a bank of MPEG-2 decoders 810, 811 for decoding the MPEG-2 video streams received from cable/satellite providers. Each MPEG-2 decoder 810 is typically only capable of decoding a single MPEG-2 stream at a time. As such, in one embodiment, a decoder resource allocation module 306 intelligently allocates the decoders 810, 811 within the decoder subsystem 313 based on the detected state of each video display device 440-442. Thus, in response to detecting that display device 440 has been turned "on" and that display device 441 is "off," the multimedia decoder resource allocation module 306 may reallocate one of the decoders 810 from receiving node 411 to receiving node 410, as illustrated. Although illustrated in FIG. 8 as a subsystem comprised of two MPEG-2 decoders, various different types of audio and video decoders may be employed in the originating node 200 and allocated by the resource allocation module 306 while still complying with the underlying principles of the invention (e.g., MPEG-4 decoders, RealVideo 8 decoders, Advanced Audio Coding (AAC) decoders, MP3 decoders, . . . etc).

Figure 9:
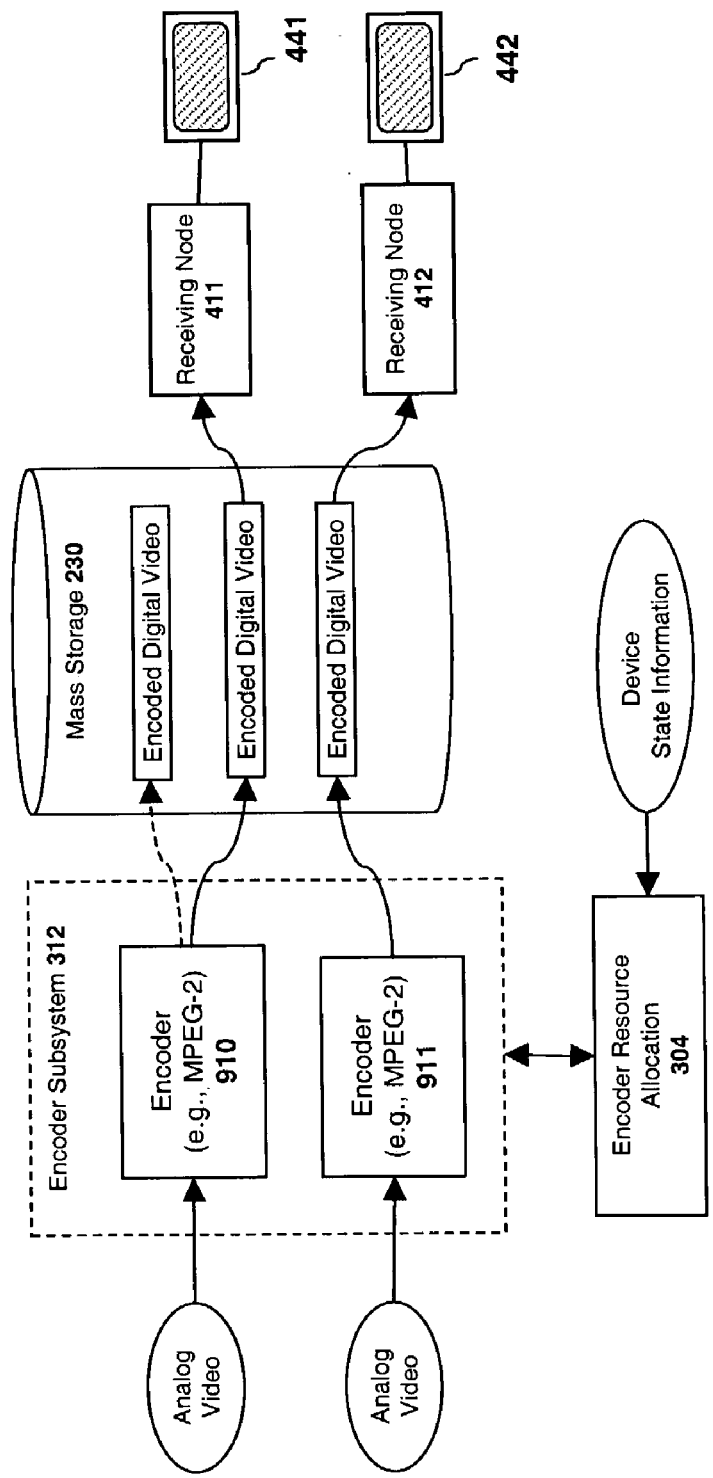
FIG. 9 illustrates an encoder resource allocation module according to one embodiment of the invention.

Cable companies transmit a number of basic cable channel in analog format. As such, current PVR systems are equipped with encoders to digitally encode the analog channels prior to storing content from the analog channels on the mass storage device 230. Referring now to FIG. 9, one embodiment of the originating node 200 includes an encoder subsystem 312 comprising a set of encoders 910, 911 to digitally encode analog channels (and/or other types of analog content). Once digitized and encoded, the channels may be stored in digital format on the mass storage device 230, and/or distributed to the various receiving nodes 411, 412. If multiple users concurrently attempt to record and/or watch multiple analog channels, however, all of the analog encoders may be utilized. Accordingly, in one embodiment, an encoder resource allocation module 304 is employed to reallocate each of the system encoders 910, 911 based on the detected states of each of the video display devices 441, 442.

For example, if the encoder resource allocation module 304 detects that display device 441 has been turned off, it may reallocate the encoder assigned to that device 441 to the mass storage device 230, as indicated (e.g., to record one of the users' "favorite" programs), or to another receiving node. Various different encoder types may be used while still complying with the underlying principles of the invention (e.g., MPEG-4 encoders, RealVideo 8 encoders, Advanced Audio Coding (AAC) encoders, MP3 encoders, . . . etc)

Figure 2:
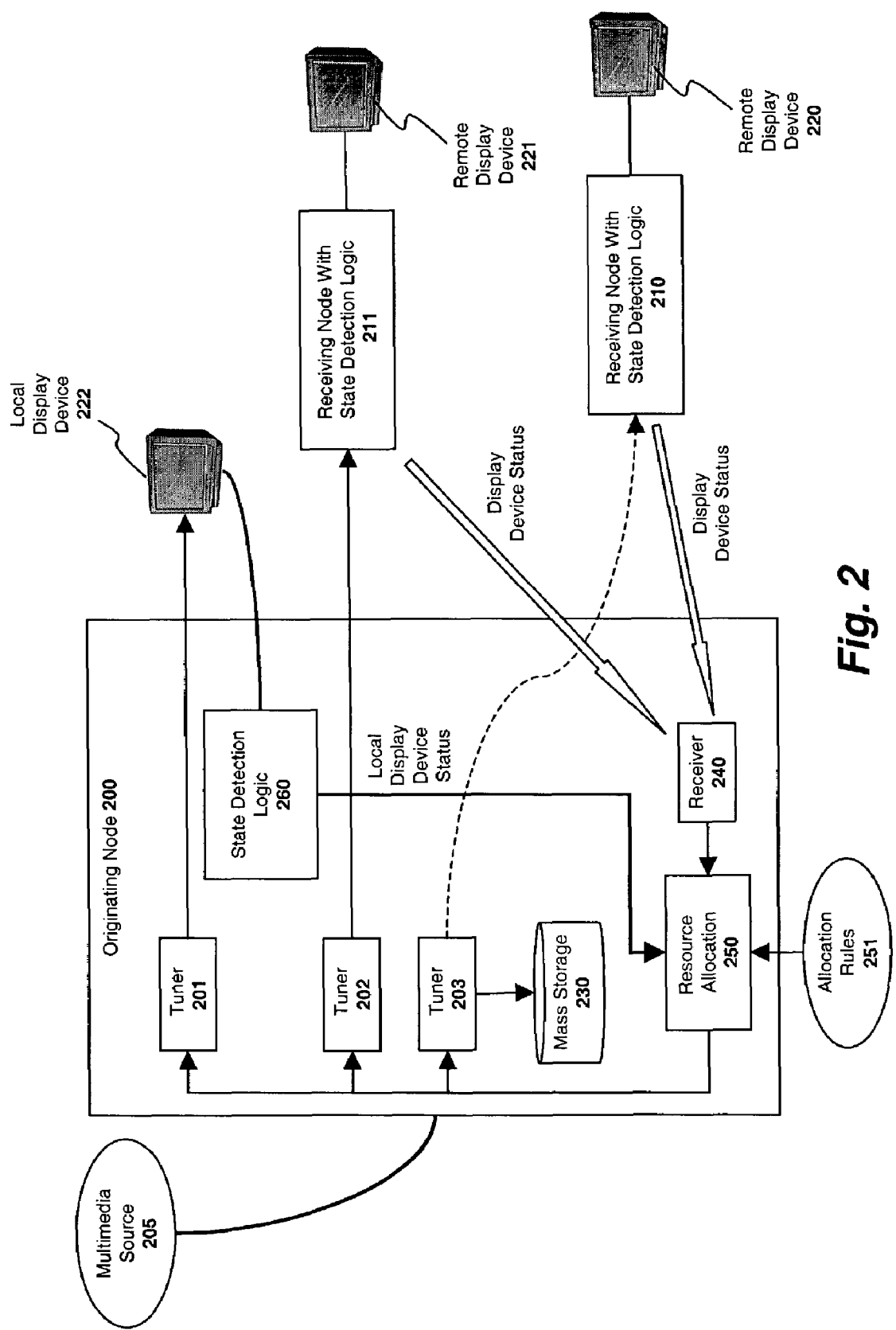
FIG. 2 illustrates one embodiment of a multimedia system in which tuners are allocated based on the detected states of a plurality of display devices.

As indicated in FIG. 2, the resource allocation module 250 may be programmed with a set of allocation rules 251 defining the circumstances under which the reallocation of different system resources may occur. In one embodiment, the user may define a prioritization scheme in which certain devices take priority over other devices. For example, the user may decide that the display device located is in the user's family room should always be capable of receiving a television channel, regardless of what else is happening on the system. As such, when the user turns on the family room television, the resource allocation module 250 reallocates any necessary system resource from the lowest-priority display device to the family room television.

In addition to prioritizing devices, allocation rules 251 may prioritize specific processing actions taken by each of the devices. For example, as described above, as described in the Device Sensing Application, the device status information may identify a state in which a VCR, DVD recorder or other recording device is actively recording a program (e.g., by measuring power consumption of the device). If so, the tuner allocation module 250 may be configured so that it never reallocates a tuner when the program provided by the tuner is being recorded on the VCR, DVD recorder or other device. Similarly, the resource allocation module 250 may be programmed (via an allocation rule 251) so that it never reallocates a system resource allocated to a user-specified recording on the mass storage device 230. By contrast, the allocation rules 250 may specify that, when a system resource is being employed to record content to the mass storage device 230 for short-term "trick modes" (e.g., pause and rewind of live television), the resource may be reallocated to a relatively higher-priority device as necessary.

Figure 10:
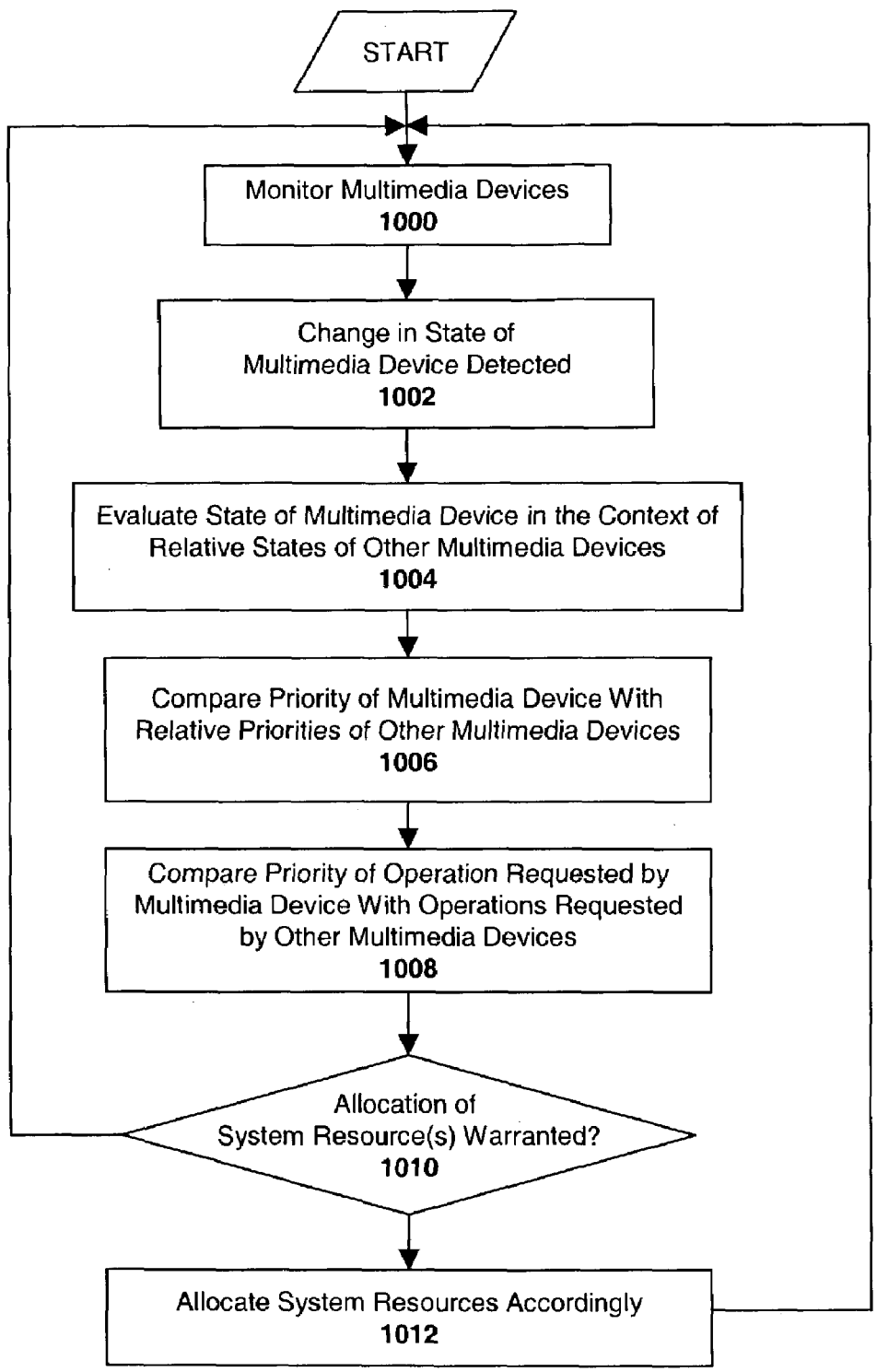
FIG. 10 is a flowchart of a method according to one embodiment of the invention.

FIG. 10 is a flowchart of a method describing one embodiment of system operation. At 1000, the states of each of the multimedia devices on the system are monitored. At 1002, the change in state of a multimedia device is detected using one or more of the state detection techniques described above. At 1004 the state of the multimedia device is evaluated in the context of the states of other multimedia devices in the system (e.g., a determination is made as to whether any other devices are active). At 1006 the priority of the device is compared against the relative priorities of the other devices in the system as described above. At 1008, the priority of the operation requested by the multimedia device is compared against the relative priorities of the operations requested by other multimedia devices in the system. Finally, at 1010, a decision is made as to whether resource allocation is warranted based on the state of the multimedia device, the relative priority of the device, and/or the relative priority of the operation requested by the device (e.g., based on the particular set of resource allocation rules applied to the system as described above). If allocation is warranted, then a system resource is reallocated at 1012; if not, then the resource is not allocated and the system again waits to detect a change in state of a multimedia device at 1000.

It should be noted that the specific examples set forth above describing the circumstances under which the resource allocation module 250 reallocates resources are for the purpose of illustration only. A virtually unlimited number of resource allocation rules 251 may be applied to the resource allocation module 250 while still complying with the underlying principles of the invention.

Embodiments of the present invention include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

Elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of embodiments of the present invention. It will be apparent, however, to one skilled in the art that these embodiments may be practiced without some of the specific details. For example, while the embodiments described above focus on reallocating system resources based on the state of a video display device, it should be noted that various other types of devices may be coupled to the receiving nodes including, for example, computer systems, audio systems, and digital/analog recording systems (e.g., VCRs or DVD recorders).

Moreover, the resource allocation module 250 may determine the state of the device based on which type of device it is. For example, the device is a computer, the state of the computer may be ascertained by communicating with the computer directly (e.g., to determine whether the computer is in a sleep mode or other low power state). In addition, while described above in the context of a single originating node 200 which provides multimedia content and data to a plurality of receiving nodes, the invention may be implemented with any number of "originating nodes" and "receiving nodes" (e.g., the originating node is not necessarily a "set-top box").

Accordingly, the scope and spirit of the invention should be judged in terms of the claims which follow.

What is claimed is:

1. A method comprising:
 detecting whether a multimedia device having access to a system resource is in a first state or a second state;
 making the system resource accessible to device other than the multimedia device when the multimedia device is in the first state, and making the system resource inaccessible to the other device when the multimedia device is in the second state;
 detecting whether the other device is in a first state or a second state; and
 making the system resource available to the other device only if the other device is in the second state.

2. The method of claim 1 wherein the system resource comprises wireless bandwidth.

3. The method of claim 1 wherein the system resource comprises a CPU resource.

4. The method of claim 1, wherein the system resource comprises resources of a mass storage device subsystem.

5. The method as in claim 1 wherein the system resource comprises a multimedia decoder or a multimedia encoder.

6. The method as in claim 1 wherein the system resource comprises a decryption subsystem resource.

7. The method as in claim 1 wherein the other device is a second multimedia device.

8. The method as in claim 1 wherein the other device is an audio rendering device.

9. The method as in claim 1 wherein the system resource is a tuner to tuning to a specified cable or satellite channel.

10. The method as in claim 1 wherein the first state is an inactive state and the second state is an active state.

11. The method as in claim 1 further comprising:
   prioritizing the multimedia device relative to the other device; and
   making the system resource inaccessible to the other device when the multimedia device is prioritized relatively higher than the other device, even if both the multimedia device and the other device are in the second state.

12. The method as in claim 11 wherein the first state is an inactive state and the second state is an active state.

13. The method as in claim 1 further comprising:
   providing the system resource to the other device in response to detecting a request for the system resource from the other device.

14. The method of claim 1, further comprising:
   determining a processing action associated with the indicated state of the device;
   applying a resource allocation rule in accordance with the processing action; and
   assigning the system resource to other devices based on the application of the resource allocation rule.

15. The method of claim 14 wherein the resource allocation rule identifies circumstances under which allocating the resource to other devices is and is not permitted, the circumstances respectively including when the processing action can and cannot be interrupted.

16. The method of claim 15, wherein the circumstances indicate that the system resource cannot be allocated to other devices when the processing action is a user-specified recording of a program to which the system resource is allocated.

17. The method of claim 15, wherein the circumstances indicate that the system resource can be assigned to other devices when the processing action is a trick-mode recording of a program to which the resource is allocated.

18. A system comprising:
   an originating node having system resources to be utilized to deliver multimedia content and/or data to a plurality of multimedia devices;
   a resource allocation module to allocate the system resources to each of the multimedia devices based on a detected state of each of the multimedia devices; and
   state detection logic to detect whether a first multimedia device is in a first state or a second state, and to provide the detected state of the multimedia device to the resource allocation module, wherein the resource allocation module makes a system resource accessible to other multimedia devices when the first multimedia device is in the first state, and makes the system resource inaccessible to the other multimedia devices when the first multimedia device is in the second state.

19. The system as in claim 18 wherein the originating node comprises a transceiver to transmit the multimedia content to one or more of the plurality of multimedia devices and wherein one of the system resources allocated by the resource allocation module comprises the bandwidth utilized by the transceiver.

20. The system as in claim 19 wherein the transceiver is a wireless transceiver.

21. The system as in claim 18 wherein the originating node comprises a CPU to process program code and data and wherein one of the system resources allocated by the resource allocation module comprises CPU processing resources.

22. The system of claim 18 wherein the originating node comprises a mass storage subsystem to store the multimedia content and/or data and wherein one of the system resources allocated by the resource allocation module comprises hard drive subsystem resources.

23. The system as in claim 18 wherein the originating node comprises a multimedia decoder subsystem to decode the multimedia content and wherein one of the system resources allocated by the resource allocation module comprises a decoder within the multimedia decoder subsystem.

24. The system as in claim 18 wherein the originating node comprises a multimedia encoder subsystem to encode the multimedia content and wherein one of the system resources allocated by the resource allocation module comprises an encoder within the multimedia encoder subsystem.

25. The system as in claim 18 wherein the originating node comprises a decryption subsystem to decrypt the multimedia content and wherein one of the system resources allocated by the resource allocation module comprises a decryption module within the decryption subsystem.

26. The system as in claim 18 wherein the originating node comprises a plurality of tuners to tune to the multimedia content and wherein one of the system resources allocated by the resource allocation module comprises a tuner from the plurality of tuners.

27. The system as in claim 18 wherein one of the multimedia devices is a television and wherein the multimedia content comprises cable or satellite programming.

28. The system as in claim 18 wherein one of the multimedia devices comprises an audio rendering device.

29. The system as in claim 18 wherein the first state is an inactive state and the second state is an active state.

30. The system as in claim 29 wherein the state detection logic detects whether a second multimedia device is in an active state or an inactive state and provides the detected state of the second multimedia device to the resource allocation module; and
   wherein the resource allocation module makes the system resource available to the second multimedia device only if the second multimedia device is in an active state.

31. An article of manufacture comprising a computer-readable medium selected from the group consisting of floppy diskettes, optical disks, CD-ROMs, magneto-optical disks, ROMs, RAMs, EPROMs, EEPROMs, magnet cards, and optical cards having program code stored thereon which, when executed by a computer cause the computer to perform the operations of:
   detecting whether a multimedia device having access to a system resource is in a first state or a second state;
   making the system resource accessible to another device when the multimedia device is in the first state, and making the system resource inaccessible to the other device when the display device is in the second state; and detecting whether the other device is in a first state or a second state; and making the system resource available to the other device only if the other device is in the second state.

32. The article of manufacture of claim 31 wherein the system resource comprises wireless bandwidth.

33. The article of manufacture of claim 31 wherein the system resource comprises a CPU resource.

34. The article of manufacture of claim 31, wherein the system resource comprises resources of a mass storage device subsystem.

35. The article of manufacture as in claim 31 wherein the system resource comprises a multimedia decoder.

36. The article of manufacture as in claim 31 wherein the system resource comprises a multimedia encoder.

37. The article of manufacture as in claim 31 wherein the system resource comprises a decryption subsystem resource.

38. The article of manufacture as in claim 31 wherein the other device is a second multimedia device.

39. The article of manufacture as in claim 31 wherein the other device is an audio rendering device.

40. The article of manufacture as in claim 31 wherein the system resource is a tuner to tuning to a specified cable or satellite channel.

41. The article of manufacture as in claim 31 wherein the first state is an inactive state and the second state is an active state.

42. The article of manufacture as in claim 31 including additional program code to cause the machine to perform the operations of:

prioritizing the multimedia device relative to the other device; and making the system resource inaccessible to the other device when the multimedia device is prioritized relatively higher than the other device, even if both the multimedia device and the other device are in the second state.

43. The article of manufacture as in claim 31 wherein the first state is an inactive state and the second state is an active state.

44. The article of manufacture of claim 31 including additional program code to cause the machine to perform the operations of:

determining a processing action associated with the indicated state of the device;

applying a resource allocation rule in accordance with the processing action; and assigning the system resource to other devices based on the application of the resource allocation rule.

45. The article of manufacture of claim 44, wherein the resource allocation rule identifies circumstances under which allocating the resource to other devices is and is not permitted, the circumstances respectively including when the processing action can and cannot be interrupted.

46. The article of manufacture of claim 45, wherein the circumstances indicate that the system resource cannot be allocated to other devices when the processing action is a user-specified recording of a program to which the system resource is allocated.

47. The article of manufacture of claim 45, wherein the circumstances indicate that the system resource can be assigned to other devices when the processing action is a trick-mode recording of a program to which the resource is allocated.

\* \* \* \* \*